Patented Dec. 19, 1950

2,534,255

UNITED STATES PATENT OFFICE 2,534,255

HYDROXY POLYESTERS

Edward M. Filachione, Philadelphia, Pa., Martin L. Fein, Riverside, N. J., and Charles H. Fisher, Abington, Pa., assignors to the United States of America as represented by the Secretary of Agriculture No Drawing. Application August 22, 1947, Serial No. 770,179

15 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to polyesters, and more particularly to polyesters derived from hydroxy carboxylic acids, and has among its objects the provision of new compositions of matter and processes for their preparation.

We have found that hydroxy polyesters containing two or more ester groups per molecule, and having a saponification equivalent not substantially less than 78.6, can be produced by heating esters of hydroxy carboxylic acids thereby causing them to undergo intermolecular self-alcoholysis according to the following general equation:

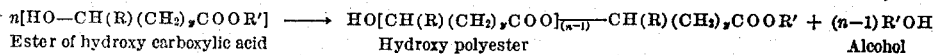

Ester of hydroxy carboxylic acid     Hydroxy polyester                   Alcohol wherein R is a member selected from the group consisting of hydrogen and an alkyl group, R' is a member selected from the group consisting of an alkyl, alkenyl, haloalkyl, haloalkenyl, alkoxyalkyl, alkenoxyalkyl, aralkyl and cycloalkyl group, $n$ is an integer larger than 1, and $y$ is an integer selected from the group consisting of zero and an integer larger than 3. In our preferred embodiment, R is a member selected from the group consisting of hydrogen and a lower alkyl group, R' represents a lower alkyl group, $n$ is a small integer larger than 1 and preferably from 2 to 4 inclusive, and $y$ is zero, thereby restricting the hydroxy polyesters to derivatives of lower alkyl esters of lactic and glycolic acids. The formula of the preferred hydroxy polyesters may thus be represented as follows:

wherein R, R', and $n$ have the preferred values indicated above.

We have also found that derivatives of such hydroxy polyesters can be produced by interaction of the polyester with compounds capable of reacting with the hydroxyl group and with the —COOR' group.

According to our invention, hydroxy polyesters corresponding to the general formula shown above are obtained by causing an ester of a hydroxy carboxylic acid to undergo intermolecular self-alcoholysis by heating the ester in the fluid state, that is, in either the liquid or vapor phase, preferably in the presence of a reaction catalyst, and with simultaneous removal of the liberated alcohol from the reaction mixture. Suitable reaction catalysts include acidic and basic esterification and alcoholysis catalysts, such as sulfuric, hydrochloric or phosphoric acid, sulfur dioxide, boric anhydride, boron trifluoride, toluene sulfonic acid, aluminum ethylate, magnesium methylate and other alcoholates of metals such as sodium, magnesium, aluminum and the like; acidic salts like aluminum chloride, ferric chloride, copper sulfate; ion-exchange resins containing acidic groups as, for example, modified phenol-formaldehyde sulfonic acid type and sulfonated coal ion exchange resins.

The process is applicable to esters of aliphatic hydroxy carboxylic acids in general, and especially to esters of aliphatic hydroxy monocarboxylic acids. The preferred esters are the esters of lactic and glycolic acids, although other esters of alpha-hydroxy carboxylic acids like alpha-hydroxybutyric and alpha-hydroxyvaleric acid and of other hydroxy carboxylic acids such as omega-hydroxycaproic, omega-hydroxycaprylic and hydroxystearic acid are suitable. It is preferred that the ester group of the hydroxy carboxylic acid ester contain a lower alkyl group, although it may contain a higher alkyl, alkenyl, haloalkyl, haloalkenyl, alkoxyalkyl, alkenoxyalkyl, aralkyl, and cycloalkyl radical as, for example, a methyl, ethyl, propyl, butyl, allyl, crotyl, chloroethyl, chlorobutyl, chloroallyl, chlorocrotyl, ethoxyethyl, butoxyethyl, vinyloxyethyl, allyloxyethyl, crotyloxyethyl, benzyl, and cyclohexyl radical.

The molecular weight and composition of the hydroxy polyester formed depends on the duration of the self-alcoholysis process and the amount of alcohol removed from the reaction mixture. For example, when the process is applied to methyl lactate, and this is self-alcoholized in a sealed vessel so that no methanol is removed, approximately 30 percent of the methyl lactate undergoes reaction to produce hydroxy polyesters. The composition of the reaction product is approximately three-fourths methyl lactyllactate (isolated by distillation) and the remainder is a mixture of trimer, tetramer, and pentamer. If, however, the process is carried out so that one mole of methanol is removed from two moles of methyl lactate, it is found that approximately 80 percent of the methyl lactate undergoes self-alcoholysis. The composition of the reaction product is approximately 45 percent by weight of methyl lactyllactate and the remainder is distributed over the methyl esters of higher polylactic acids such as methyl trilactate, tetralactate, an pentalactate. Thus it can be seen that the reaction product of the self-alcoholysis of methyl lactate is a mixture of hydroxy polyesters and the composition of this mixture is variable and will depend on the duration of the alcoholysis and the amount of methanol removed from the reaction mixture. Therefore, by extending the duration of the process and by removing larger proportions of methanol from the reaction mixture the average molecular weight of the hydroxy polyesters will be increased.

In a similar manner other alkyl, alkenyl, haloalkyl, haloalkenyl, alkoxyalkyl, alkenoxyalkyl, aralkyl and cycloalkyl esters of various aliphatic hydroxy monocarboxylic acids can be utilized in the preparation of the corresponding esters of dimeric, trimeric, tetrameric, and pentameric hydroxy acids. For example, formation of the allyl ester of polyglycolic acid from allyl glycolate is represented by the following equation:

$$n[HOCH_2COOCH_2CH=CH_2] \longrightarrow HO(CH_2COO)_{\overline{(n-1)}}-CH_2COOCH_2CH=CH_2 + (n-1)[CH_2=CHCH_2OH]$$

where $n$ is an integer larger than 1. The hydroxy polyesters so produced, can be recovered from the reaction products, for example, by fractional or molecular distillation, or by solvent extraction, or they may be utilized in subsequent operations admixed with hydroxy polyesters of higher molecular weight.

Production of hydroxy polyesters by intermolecular alcoholysis of hydroxy carboxylic acid esters is not limited to the use of one ester as the starting material. Mixed hydroxy polyesters can be obtained by using mixtures of several esters. Thus, for example, if the process is applied to a mixture of several lactic acid esters like methyl and butyl lactates, the reaction products will contain a mixture of methyl polylactate and butyl polylactate. If the mixture of esters used as the starting material comprises esters derived from different hydroxy carboxylic acids, for example, methyl lactate and methyl glycolate, the reaction products will include hydroxy polyesters derived from mixed polymeric hydroxy acids which contain in their molecule the acyl radicals of both lactic and glycolic acid.

Hydroxy polyesters corresponding to the aforementioned general formula can also be produced by heating the hydroxy carboxylic acid with the corresponding alcohol in a molar acid to alcohol ratio of at least 2:1 and removing the water formed from the reaction mixture by distillation, preferably in the presence of a suitable entraining agent such as benzene.

The —COOR' group of the hydroxy polyesters of the present invention, wherein R' represents an alkyl, preferably a lower alkyl, alkenyl, haloalkyl, haloalkenyl, alkoxyalkyl, alkenoxyalkyl, aralkyl and cycloalkyl radical, can be subjected to alcoholysis, either by conducting the self-alcoholysis of the hydroxy carboxylic acid ester used as the starting material in the presence of a hydroxy compound having a boiling point higher than that of the alcohol formed on self-alcoholysis of the hydroxy carboxylic acid ester, or by reacting the hydroxy polyester with such a hydroxy compound. Such suitable hydroxy compounds include aliphatic, aromatic, carbocyclic and heterocyclic compounds containing at least one alcoholic hydroxyl group capable of reacting by alcoholysis with an organic ester. Examples of such hydroxy compounds are monohydric alcohols like ethyl, butyl, amyl, 2-ethylbutyl, 2-ethylhexyl, benzyl, furfuryl, tetrahydrofurfuryl and cyclohexyl alcohol; polyhydric alcohols, like ethylene glycol, propylene glycol, and glycerol; alcohol-ethers such as methyl, ethyl, butyl, phenyl and other monoethers of ethylene glycol, diethylene glycol and its monoethers like diethylene glycol monoethyl and monobutyl ether; alcohol-esters such as ethylene glycol monoacetate, diethylene glycol monoacetate and esters of glycerol such as glyceryl monolaurate, glyceryl dilaurate, glyceryl monomyristate, glyceryl monolaurate monolactate, and the like. For example, on subjecting methyl lactate to self-alcoholysis in the presence of 2-ethylbutanol, 2-ethylbutyl esters of polylactic acids are formed $$3[HO—CH(CH_3)COOCH_3] + HOCH_2CH(C_2H_5)CH_2CH_3 \rightarrow$$
$$HO[CH(CH_3)COO]_2CH(CH_3)$$
$$COOCH_2CH(C_2H_5)CH_2CH_3 + 3[CH_3OH]$$

The hydroxy polyesters produced by any of the above-described procedures can be converted to various derivatives by interaction with compounds capable of reacting with a hydroxyl group such as an organic, aliphatic or aromatic carboxylic acid acylating agent like organic carboxylic acids, their esters, their chlorides, and anhydrides. For example, the hydroxyl group of the hydroxy polyester can be acylated by reacting it with an ester of a carboxylic acid or by conducting the self-alcoholysis of the hydroxy carboxylic acid ester used as the starting material, in the presence of an ester of the carboxylic acid used to acylate the hydroxyl group of the hydroxy polyester. Derivatives so formed have the following general formula:

$$R''O—[CH(R)(CH_2)_yCOO]_nCH(R)(CH_2)_yCOOR'$$

wherein R is a member selected from the group consisting of hydrogen and an alkyl group, R' is a member selected from the group consisting of an alkyl, alkenyl, haloalkyl, haloalkenyl, alkoxyalkyl, alkenoxyalkyl, aralkyl, and cycloalkyl group, R'' represents an organic carboxylic acyl radical, $y$ is an integer selected from the group consisting of the integer zero and an integer larger than 3, and $n$ represents a small integer. These derivatives have a saponification equivalent not substantially less than 72.0. In the preferred embodiment, $y$ being zero, this formula becomes $$R''O—[CH(R)COO]_nCH(R)COOR'$$

wherein R is a member selected from the group consisting of hydrogen and a lower alkyl group, R' represents a lower alkyl group, R'' represents an organic carboxylic acyl group, and $n$ is a small integer larger than 1, and preferably from 2 to 4, inclusive. Esters suitable for effecting the acylation of the hydroxyl group of the hydroxy polyester include esters of aliphatic and aromatic mono- and polycarboxylic acids like methyl and ethyl acetate and propionate, propyl benzoate, methyl phthalate, and so forth. Thus, for instance, the butyrate of methyl polylactate is obtained from methyl lactate and methyl butyrate $$3[HOCH(CH_3)COOCH_3] + CH_3CH_2CH_2COOCH_3 \rightarrow$$
$$CH_3CH_2CH_2COO—$$
$$[CH(CH_3)COO]_2CH(CH_3)COOCH_3 + 3[CH_3OH]$$

When esters of di- or other polycarboxylic acids are used to acylate the hydroxy polyester, one or more molecules of the hydroxy polyester are acylated depending on the molecular ratio of the reactants, duration of the process and the amount of alcohol removed from the reaction mixture. For example, methyl trilactate methyl adipate, and the methyl trilactate diester of adipic acid are formed from methyl adipate and methyl lactate:

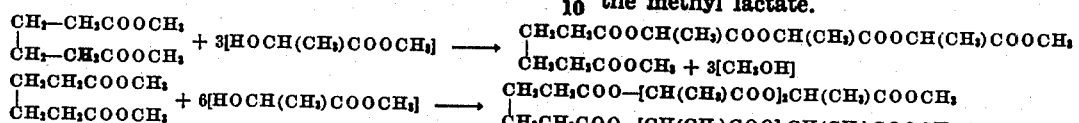
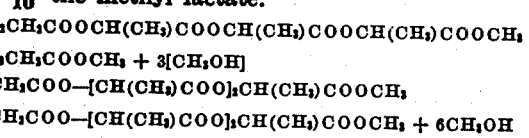

The hydroxyl group of hydroxy polyesters can also be acylated by reacting it with anhydrides, acid chlorides, and other acylating agents, as for example, acetic, maleic, and phthalic anhydride, acetyl, propionyl, crotonyl, succinyl and benzoyl chloride. It can also be acetylated by reacting it with ketene or vinyl acetate; converted to a lactyllactic acid ester group by reacting it with a lactide; converted to an ether group by reacting it with methyl, ethyl, chlorobutyl, allyl, chloroallyl, and benzyl chloride or with any other alkyl, alkenyl, or aralkyl chloride; reacted with phosgene or an alkyl or alkenyl chloroformate, like methyl or allyl chloroformate to yield the corresponding ester of carbonic acid; and reacted with an isocyanate, for example ethyl isocyanate, to form the ethyl carbamic acid ester of the hydroxy polyester.

It is apparent that the characteristics and properties of the various hydroxy polyesters and their derivatives produced by the above-described procedures will vary depending on the starting material used, the molecular weight of the hydroxy polyester formed, and the nature of the reactant used in preparing their derivatives.

In general, the products of our invention include compounds useful as solvents and plasticizers, insecticides, pesticides, insect repellents, and intermediates for the production of resin and synthetic chemicals. Products containing one olefinic linkage are suitable intermediates for the production of thermoplastic resins, where as those containing two or more olefinic linkages, for example, allyl carbonate of allyl triglycolate having the formula:

and the crotonate of allyl triglycolate corresponding to the formula:

can be transformed by addition polymerization into insoluble infusible resins.

The following examples are illustrative of the invention:

Example I

A mixture of 208 g. (2 moles) of methyl lactate and 0.5 ml. of concentrated sulfuric acid was heated in a sealed vessel at 100° C. for 4.5 hours. On cooling, 2 g. of anhydrous sodium acetate was added and the mixture freed from methanol and unreacted methyl lactate by distillation in vacuum (until vapor temperature was 80° C. at 3.0 mm.) leaving 41 g. of methyl polylactate. Redistillation of the volatile material showed that 72 percent of the methyl lactate was recovered unchanged.

Example II

The procedure of Example I was carried out using sulfur dioxide as the catalyst. Thus, from 208 g. (2 moles) of methyl lactate and 2 g. of sulfur dioxide, there was obtained 12 g. of methanol, 140 g. of unreacted methyl lactate, and 42 g. of methyl polylactate, a conversion of 33 percent of the methyl lactate.

Example III

A flask containing 624 g. (6 moles) of methyl lactate and 1.5 ml. of concentrated sulfuric acid, and fitted with a capillary air inlet tube to prevent bumping, was attached to a 2-foot Vigreux distillation column.

The system was operated at a pressure of approximately 133 mm. and the flask was heated by a boiling water bath. Ice water was circulated through the condenser to condense methanol. As rapidly as it was formed, methanol was distilled from the reaction mixture, the take-off being adjusted to maintain the vapor temperature below 37° C. After 3 hours, there was collected 57.5 g. (1.8 moles) of methanol. The reaction was then discontinued and 6 g. of anhydrous sodium acetate was added, and 261 g. (2.5 moles) of unreacted methyl lactate was collected at 22 mm. (last traces removed at 1 mm.), this representing a conversion of 58 percent of the methyl lactate. The residual methyl polylactate amounted to 282 g.

Example IV

A mixture of 1040 g. (10 moles) of methyl lactate and 2.5 ml. of concentrated sulfuric acid was reacted as described in Example III. The reaction was carried out at 100° C. for 6 hours at a pressure of 113 to 134 mm., and then for 2 hours at a pressure of 60 to 75 mm. At the end of this time, there was formed 153 g. (4.78 moles) of methanol. Eight g. of anhydrous sodium acetate was then added to the reaction mixture, and 221 g. (2.12 moles) of unreacted methyl lactate was removed showing that 79 percent of the methyl lactate underwent reaction. There remained in the reaction flask 664 g. of methyl polylactate as a viscous light yellow liquid.

Example V

A mixture of 416 g. (4 moles) of methyl lactate and 4 ml. of concentrated sulfuric acid was reacted essentially as described in Example III, except that the reaction was conducted at a pressure of approximately 100 mm. After 10.5 hours, there was collected 70.5 g. (2.2 moles) of methanol. Sixteen g. of anhydrous sodium acetate was then added to the mixture, and unreacted methyl lactate was removed by distillation under vacuum (23 mm., then finally 1 mm.), thus indicating that 75 percent of the methyl lactate was converted to methyl polylactate.

Example VI

To 208 g. (2.0 moles) of methyl lactate was added 7.0 g. (0.1 mole) of boric anhydride ($B_2O_3$). This mixture, after standing for 3 days, was heated at 100° C. under a pressure of 98 mm., the methanol, as formed, being continuously distilled off. After 7 hours, there was obtained 35 g. (1.1 moles) of methanol. The reaction mixture was then heated at 0.3 mm. to 100° C. for 3 hours and 35 g. of unreacted methyl lactate (83 percent conversion) was recovered. The residual methyl polylactate that remained was a very pale yellow, viscous liquid, almost gel-like, and amounted to 135 g.

Exampe VII

A mixture of methyl lactate, 1664 g. (16 moles) and 4.0 ml. of concentrated sulfuric acid was heated at 85°–95° C. under a pressure of 100 mm. to distil methanol from the reaction mixture as described in Example III. After 13.5 hours, distillation of methanol practically ceased. Then, without neutralizing the catalyst, the pressure was lowered to 1 mm. and unreacted methyl lactate was distilled from the reaction mixture at a final pot temperature of 94° C. This required 5.5 hours. The residue, methyl polylactate, amounted to 969 g. and was a pale yellow viscous liquid: $n_D^{20}$, 1.4430; $d_4^{20}$, 1.2043; saponification equivalent 78.6.

Redistillation of the volatile materials gave 259 g. (8.1 moles) of methanol and 393 g. (3.78 moles) of unreacted methyl lactate, or a conversion of 76 percent of the methyl lactate.

Example VIII

A portion, 242 g., of the methyl polylactate prepared in Example VII was reacted with 153 g. of acetic anhydride at a temperature of 50° to 60° C. The mixture was then heated for 5.5 hours on the steam bath. After adding 4 g. of anhydrous sodium acetate, the reaction mixture was topped in vacuum at a bath temperature of 100° C. and a final pressure of 1.0 mm. The residue was dissolved in a benzene-petroleum ether mixture, washed twice with water, next with sodium bicarbonate solution until free of acid, and then again with water. In cases where emulsification occurred, inorganic salts were used in the wash water. The solvent was removed by distillation in vacuum, finally at a pressure of 1.0 mm., at a pot temperature of 100° C. The residual acetate of methyl polylactate was a dark brown liquid which when treated with 5 g. of decolorizing carbon was a clear, almost colorless, viscous liquid: $n_D^{20}$, 1.4391; $d_4^{20}$, 1.1907; saponification equivalent, 72.0.

Example IX

Another 242 g. portion of methyl polylactate prepared in Example VII, was reacted with 195 g. of proprionic anhydride. The product was isolated as described in Example VIII above. The resulting propionate of methyl polylactate was a viscous, almost colorless liquid: $n_D^{20}$, 1.4393; $d_4^{20}$, 1.1170; saponification equivalent, 75.5.

Example X

Another 242 g. portion of the methyl polylactate prepared in Example VII was reacted with 237 g. of n-butyric anhydride and the product was isolated as described in Example VIII above. There was obtained 255 g. of the butyrate of methyl polylactate as a pale, straw-colored liquid: $n_D^{20}$, 1.4398; $d_4^{20}$, 1.1562; saponification equivalent, 77.6.

Example XI

A 60.5 g. portion of the methyl polylactate, prepared in Example VII, was mixed with 54.7 g. (0.25 mole) of lauroyl chloride, and this was heated on a steam bath for 2 hours. A brisk evolution of hydrogen chloride took place. Dissolved hydrogen chloride was then removed by a water aspirator. The resulting product was dissolved in a mixture of benzene and petroleum ether and this solution washed five times with 100 cc. portions of 3 percent aqueous pyridine. The solvent was then removed on a water bath at a final pressure of 1 mm. There remained 94 g. of the laurate of methyl polylactate as a virtually colorless mobile liquid: $n_D^{20}$, 1.4447; $d_4^{20}$, 1.0363; saponification equivalent, 107.3.

Example XII

A 60.5 g. portion of the methyl polylactate, prepared in Example VII, was mixed with 29 g. of diethylene glycol bis(chloroformate) and this mixture heated for 15 hours on a steam bath. The resulting product was dissolved in benzene and washed with 10 percent aqueous pyridine and then several times with water. Removal of the solvent left 44 g. of the diglycol carbonate ester of methyl polylactate as a brown, very viscous liquid: $n_D^{20}$, 1.4506.

Example XIII

A 60.5 g. portion of the methyl polylactate, prepared in Example VII, was mixed with 18.5 g. of phthalic anhydride. This mixture was then heated under a pressure of 22 mm. for 6 hours at 100° C. and then for 5.5 hours at 120°–130° C. The resulting product was dissolved in ethyl ether, the ether solution washed twice with 100 cc. portions of 10 percent aqueous pyridine, and then several times with water. Upon evaporation of the solvent, there remained 45 g. of the phthalate of methyl polylactate as a brown, tacky, very viscous liquid: $n_D^{20}$, 1.4753; saponification equivalent, 78.3.

Example XIV

Two moles, 208 g., of methyl lactate was mixed with 3.8 g. (0.02 moles) of p-toluenesulfonic acid monohydrate, and this mixture was boiled on a Vigreux still at atmospheric pressure with methanol being taken off at the still head. After 2.75 hours, 39 g. (1.23 moles) of methanol was obtained, the pot temperature rising to 190° C. The mixture was then cooled and unreacted methyl lactate was removed by distillation at 1.0 mm. resulting in 25 g. of methyl lactate, or a conversion of 88 percent. There remained 142 g. of methyl polylactate, $n_D^{20}$, 1.4468; saponification equivalent, 81.9.

This methyl polylactate was reacted with 37 g. of acetic anhydride and the product isolated as described in Example VIII above. There was obtained 88 g. of the acetate of methyl polylactate as a viscous, straw-colored liquid: $n_D^{20}$, 1.4419; $d_4^{20}$, 1.2044; saponification equivalent, 73.3.

Example XV

To 472 g. (4 moles) of ethyl lactate was added 1 ml. of concentrated sulfuric acid. This mixture was attached to a Vigreux still and self-alcoholysis was carried out, with removal of ethanol, by heating at 100° C. under a pressure of 100 mm., as described in Example III. After 10.75 hours, distillation of ethanol practically ceased and unreacted ethyl lactate was then removed by distillation at 1.0 mm. There remained 224 g. of ethyl polylactate as a viscous, pale, straw-colored liquid: $n_D^{20}$, 1.4400; $d_4^{20}$, 1.1695; saponification equivalent, 84.4.

Redistillation of the volatile material gave 85 g. (1.85 moles) of ethanol and 150 g. (1.27 moles) of ethyl lactate or a 68% conversion of ethyl lactate.

Example XVI

A 100 g. portion of the ethyl polylactate, prepared in Example XV, was reacted with 63 g. of acetic anhydride and the acetate of ethyl polylactate was isolated as described in Example VIII. There was obtained 114 g. of product which was an almost colorless viscous liquid: $n_D^{20}$, 1.4360; $d_4^{20}$, 1.1621; saponification equivalent, 74.9.

Example XVII

A 120 g. portion of the ethyl polylactate, prepared in Example XV, was reacted with 104 g. of propionic anhydride and the product isolated as described in Example VIII. There resulted 108 g. of the propionate of ethyl polylactate as a pale, yellow viscous liquid: $n_D^{20}$, 1.4364; $d_4^{20}$, 1.1435; saponification equivalent, 78.0.

Example XVIII

A mixture of 584 g. (4 moles) of n-butyl lactate and 1 ml. of concentrated sulfuric acid was heated on a Vigreux still by a boiling water bath under a pressure of 12 to 23 mm., and n-butyl alcohol, formed by the alcoholysis, was continuously removed at the still head. After 11 hours under these conditions, reaction apparently ceased. Unreacted butyl lactate was then distilled from the mixture at a pressure of 1 mm. and a final temperature of 100° C. There remained 247 g. of butyl polylactate as a dark brown, mobile liquid: $n_D^{20}$, 1.4388; $d_4^{20}$, 1.1165; saponification equivalent, 94.9.

Redistillation of the volatile materials gave 148 g. (2.0 moles) n-butyl alcohol and 182 g. (1.24 moles) of unreacted butyl lactate, or a conversion of 69 percent of the butyl lactate.

Example XIX

A 116 g. portion of the butyl polylactate, prepared in Example XVIII, was reacted with 63 g. of acetic anhydride and the product isolated as described in Example VIII. There was obtained 129 g. of the acetate of butyl polylactate as a brown mobile liquid: $n_D^{20}$, 1.4346; $d_4^{20}$, 1.1103; saponification equivalent, 82.7.

Example XX

Another 116 g. portion of the butyl polylactate, prepared in Example XVIII, was reacted with 94 g. of propionic anhydride and the product isolated as described in Example VIII. There resulted 133 g. of the propionate of butyl polylactate as a brown, mobile liquid: $n_D^{20}$, 1.4353; saponification equivalent, 83.4.

Example XXI

To 186 g. (2.07 moles) of methyl glycolate was added 0.5 ml. of concentrated sulfuric acid. This mixture was heated in a closed tube in a steam chest for 4 hours, 2.0 g. of anhydrous sodium acetate was then added, and the mixture was distilled in vacuum. The residue was finally topped at 1 mm. and a bath temperature of 100° C. There remained 26 g. of non-volatile residue, methyl polyglycolate, as a white, semi-solid waxy mass.

Redistillation of the volatile fractions gave 8 g. of methanol and 151 g. of unreacted methyl glycolate, or a conversion of 19 percent of the methyl glycolate.

Example XXII

This was similar to Example XXI except that the mixture of methyl glycolate and sulfuric acid was refluxed for 1.25 hours. Under these conditions, 26 percent of the methyl glycolate was converted into methyl polyglycolate.

Example XXIII

A mixture of 312 g. (3 moles) of methyl lactate, 74 g. (1.0 mole) of n-butyl alcohol, and 0.75 ml. of concentrated sulfuric acid was heated, on a Vigreux still, at 100° C. under 100 mm. of pressure, and the methanol, formed in the reaction, was removed at the still head (vapor temp. 22°–30° C.) as described in Example III. After 4.5 hours, removal of methanol practically ceased. After cooling, the pressure was lowered to 1 mm. and volatile material was distilled finally at a bath temperature of 100° C. There remained 136 g. of a yellow, viscous liquid residue, which is a mixture of methyl polylactate and butyl polylactate: $n_D^{20}$, 1.4372; saponification equivalent, 91.1.

Redistillation of the volatile distillate gave 58 g. (1.81 moles) of methanol, 5.5 g. of butanol, 90 g. (0.87 moles) of methyl lactate, and 84 g. (0.58 moles) of n-butyl lactate.

On the basis of the saponification equivalents shown in the foregoing examples, as for instance, Examples VII, XIV, XV, and XVIII, it is apparent that the products, prior to acylation, are mixtures consisting of the dimeric up to and including the pentameric forms. Thus, the methyl polylactate of Example VII, having a saponification equivalent of 78.6, is essentially methyl pentalactate (on the average) and that of Example XIV, having a saponification equivalent of 81.9, consists essentially of methyl trilactate and methyl tetralactate. The ethyl polylactate of Example XV (saponification equivalent of 84.4) consists essentially of ethyl trilactate and ethyl tetralactate, and the butyl polylactate of Example XVIII (saponification equivalent of 94.9) is essentially a mixture of butyl trilactate and butyl tetralactate. It thus becomes evident that the hydroxy polyesters of the examples, prior to acylation, may be represented by the formula ($(CH_2)_y$ being zero)

HO—[CH(R)COO]$_n$CH(R)COOR' wherein $n$ is necessarily restricted to a value of from 2 to 4, inclusive.

The acylated derivatives of these esters described in the examples are compounds of substantially the same degree of intermolecular esterification, as is shown by their respective saponification equivalents, and $n$ would have the same value of 2 to 4, inclusive.

Having thus described our invention, we claim:

1. A process comprising heating an aliphatic hydroxy carboxylic acid ester of the general formula

HO—CH(R)COOR' wherein R is a member selected from the group consisting of hydrogen and a lower alkyl group and R' represents a lower alkyl group, in the presence of an esterification catalyst and with simultaneous and continuous removal of the alcohol formed, thereby to produce a hydroxy polyester of the general formula

HO—[CH(R)COO]$_n$CH(R)COOR' wherein R and R' have the same significance as above and $n$ represents a small integer larger than 1, said hydroxy polyester having a saponification equivalent not substantially less than 78.6.

2. The process of claim 1 wherein R is methyl.

3. A process comprising heating an aliphatic hydroxy carboxylic acid ester of the general formula $$HO-CH(R)COOR'$$

wherein R is a member selected from the group consisting of hydrogen and a lower alkyl group and R' represents a lower alkyl group, with an organic hydroxy compound having a higher boiling point than that of the alcohol produced by the intermolecular self-alcoholysis of the hydroxy ester and selected from the group consisting of alcohols, alcohol-ethers, and alcohol-esters, in the presence of an esterification catalyst and with continuous removal of the alcohol formed as a result of the intermolecular self-alcoholysis of said hydroxy ester, thereby to produce a hydroxy polyester of the general formula $$HO-[CH(R)COO]_nCH(R)COOR''$$

wherein R has the same significance as above, n represents a small integer larger than 1, and R'' represents the dehydroxylated radical of the organic hydroxy compound, said hydroxy polyester having a saponification equivalent not substantially less than 78.6.

4. A process comprising heating a hydroxy polyester having a saponification equivalent not substantially less than 78.6 and having the general formula $$HO-[CH(R)COO]_nCH(R)COOR'$$

wherein R is a member selected from the group consisting of hydrogen and a lower alkyl group, R' represents a lower alkyl group, and n is a small integer larger than 1, with an organic hydroxy compound having a higher boiling point than that of the alcohol formed in the reaction and selected from the group consisting of alcohols, alcohol-ethers, and alcohol-esters, in the presence of an esterification catalyst and with simultaneous and continuous removal of the alcohol formed, thereby to produce a hydroxy polyester of the general formula $$HO-[CH(R)COO]_nCH(R)COOR''$$

wherein R and n have the same significance as above and R'' represents the dehydroxylated radical of the organic hydroxy compound, said produced hydroxy polyester having a saponification equivalent substantially equal to that of the starting hydroxy polyester.

5. The process of claim 4 wherein the organic hydroxy compound is an alcohol.

6. The process of claim 4 wherein the organic hydroxy compound is an alcohol-ether.

7. The process of claim 4 wherein the organic hydroxy compound is an alcohol-ester.

8. A process comprising heating an aliphatic hydroxy carboxylic acid ester of the general formula $$HO-CH(R)COOR'$$

wherein R is a member selected from the group consisting of hydrogen and a lower alkyl group and R' represents a lower alkyl group, with an organic carboxylic acid acylating agent in the presence of an esterification catalyst, thereby to produce a compound of the general formula $$R''O-[CH(R)COO]_nCH(R)COOR'$$

wherein R and R' have the same significance as above, R'' represents an organic carboxylic acyl radical, and n represents a small integer larger than 1, said compound having a saponification equivalent not substantially less than 72.0.

9. A process comprising heating a hydroxy polyester having a saponification equivalent not substantially less than 78.6 and having the general formula $$HO-[CH(R)COO]_nCH(R)COOR'$$

wherein R is a member selected from the group consisting of hydrogen and a lower alkyl group, R' represents a lower alkyl group, and n is a small integer larger than 1, with an organic carboxylic acid acylating agent, thereby to produce a compound of the general formula $$R''O-[CH(R)COO]_nCH(R)COOR'$$

wherein R, R', and n have the same significance as above, and R'' represents an organic carboxylic acyl radical, said compound having a saponification equivalent not substantially less than 72.0.

10. A process comprising heating the product of claim 4 with an organic carboxylic acid acylating agent thereby to produce a compound of the general formula $$R''O-[CH(R)COO]_nCH(R)COOR'$$

wherein R, R', and n have the same significance as in claim 4 and R'' represents an organic carboxylic acyl radical, said compound having a saponification equivalent not substantially less than 72.0.

11. The process of claim 9 wherein the acylating agent is an organic carboxylic acid anhydride.

12. The process of claim 9 wherein the acylating agent is an ester of a carboxylic acid.

13. A process comprising heating an aliphatic hydroxy carboxylic acid ester of the general formula $$HO-CH(R)COOR'$$

wherein R is a member selected from the group consisting of hydrogen and a lower alkyl group and R' represents a lower alkyl group, with an organic hydroxy compound having a higher boiling point than that of the alcohol produced by the intermolecular self-alcoholysis of the hydroxy ester and selected from the group consisting of alcohols, alcohol-ethers, and alcohol-esters, in the presence of an esterification catalyst and with continuous removal of the alcohol formed as a result of the intermolecular self-alcoholysis of said hydroxy ester thereby to produce a hydroxy polyester having the general formula $$HO-[CH(R)COO]_nCH(R)COOR''$$

wherein R has the same significance as above, n represents a small integer larger than 1, and R'' represents the dehydroxylated radical of the organic hydroxy compound, said hydroxy polyester having a saponification equivalent not substantially less than 78.6, and then heating the formed hydroxy polyester with an organic carboxylic acid acylating agent thereby to produce a compound of the general formula $$R'''O-[CH(R)COO]_nCH(R)COOR''$$

wherein R, R'', and n have the same significance as above and R''' represents an organic carboxylic acyl group, said formed compound having a saponification equivalent not substantially less than 72.0.

14. The process of claim 13 wherein the organic hydroxy compound is an alcohol, and the acylating agent is a carboxylic acid anhydride.

15. A process comprising heating an aliphatic hydroxy carboxylic acid ester of the general formula $$HO-CH(R)COOR'$$

wherein R is a member selected from the group consisting of hydrogen and a lower alkyl group and R' represents a lower alkyl group, with an organic hydroxy compound having a higher boiling point than that of the alcohol produced by the intermolecular self-alcoholysis of the hydroxy ester and selected from the group consisting of alcohols, alcohol-ethers, and alcohol-esters, in the presence of an esterification catalyst and with continuous removal of the alcohol formed as a result of the intermolecular self-alcoholysis of said hydroxy ester thereby to produce a hydroxy polyester having the general formula $$HO-[CH(R)COO]_n CH(R)COOR''$$

wherein R has the same significance as above, $n$ represents an integer from 2 to 4, inclusive, and R'' represents the dehydroxylated radical of the organic hydroxy compound, and then heating the formed hydroxy polyester with an organic carboxylic acid acylating agent thereby to produce a compound of the general formula $$R'''O-[CH(R)COO]_n CH(R)COOR''$$

wherein R, R'', and $n$ have the same significance as above and R''' represents an organic carboxylic acyl group.

EDWARD M. FILACHIONE.
MARTIN L. FEIN.
CHARLES H. FISHER.

REFERENCES CITED

The following references are of record in the file of this patent:

UNITED STATES PATENTS

| Number | Name | Date |
|---|---|---|
| 2,127,248 | Dorough | Aug. 16, 1938 |
| 2,350,388 | Claborn | June 6, 1944 |
| 2,396,994 | Filachione | Mar. 19, 1946 |

FOREIGN PATENTS

| Number | Country | Date |
|---|---|---|
| 278,487 | Germany | Sept. 26, 1914 |